Feb. 28, 1967 R. T. BRUMBAUGH 3,306,510

ENDLESS TAPE CARTRIDGE

Filed Aug. 19, 1964

INVENTOR
ROBERT T. BRUMBAUGH

BY

Bair, Freeman & Molinare
Attys.

United States Patent Office 3,306,510

Patented Feb. 28, 1967

3,306,510
ENDLESS TAPE CARTRIDGE

Robert T. Brumbaugh, Evanston, Ill., assignor to Mangood Corporation, a corporation of Illinois Filed Aug. 19, 1964, Ser. No. 390,597
6 Claims. (Cl. 226—118)

This invention relates to an endless tape cartridge and more particularly to a cartridge for confining and folding an endless flexible tape in a random fashion.

Magnetic tape in either relatively narrow or relatively wide widths has heretofore been generally wound on spools being unwound from one spool and wound on another during use.

In counters and the like wherein the tape is fed in rapid small increments, the inertia of spools and the body of tape wound thereon has been a serious disadvantage, tending to limit the speed of incremental movement of the tape or in some cases to lead to breakage of the tape.

Furthermore, no satisfactory means for handling endless loops of tape has been devised, except for short free loops or in containers which are large relative to the length of the tape loop so that the tape lies substantially free therein. There are many uses in which continuous loops of tape are desirable as in recording various types of data, recording musical or dramatic compositions or in the recording of repetitive material.

It is accordingly one of the objects of the present invention to provide an endless tape cartridge in which an endless loop of tape is stored compactly without the use of spools or reels.

Another object is to provide an endless tape cartridge in which the tape is fed past a recording or reproducing point by driving rollers and is closely confined downstream from the rollers and closely adjacent to the bite thereof where it is placed in compression.

According to a feature of the invention the cartridge is formed of parallel walls spaced apart a distance slightly greater than the width of the tape and the spaces between which are closed at the periphery by edge portions. Recesses are formed in the edge portions to receive driving rollers and the walls of the recesses are provided with slots through which the tape extends with the slot at the downstream side of the rollers terminating in thin lips projecting closely adjacent to the bite of the rollers to confine the tape closely. A gap may be formed upstream of the recesses to receive a head for recording on or reproducing from the tape. In one desirable construction the drive rollers are permanently journalled in the recesses and at least one roller has its hub formed for driving engagement by a spindle or similar driving means.

For a reversible tape, two pairs of recesses are provided at opposite sides of the gap which receives the recording head to receive drive rollers for driving the tape selectively in such a direction that it will always be pulled through the head.

The above and other objects and features of the invention will be more readily apparent from the following description when read in connection with the accompanying drawing, in which.

Figures 1, 2, 3, 4:
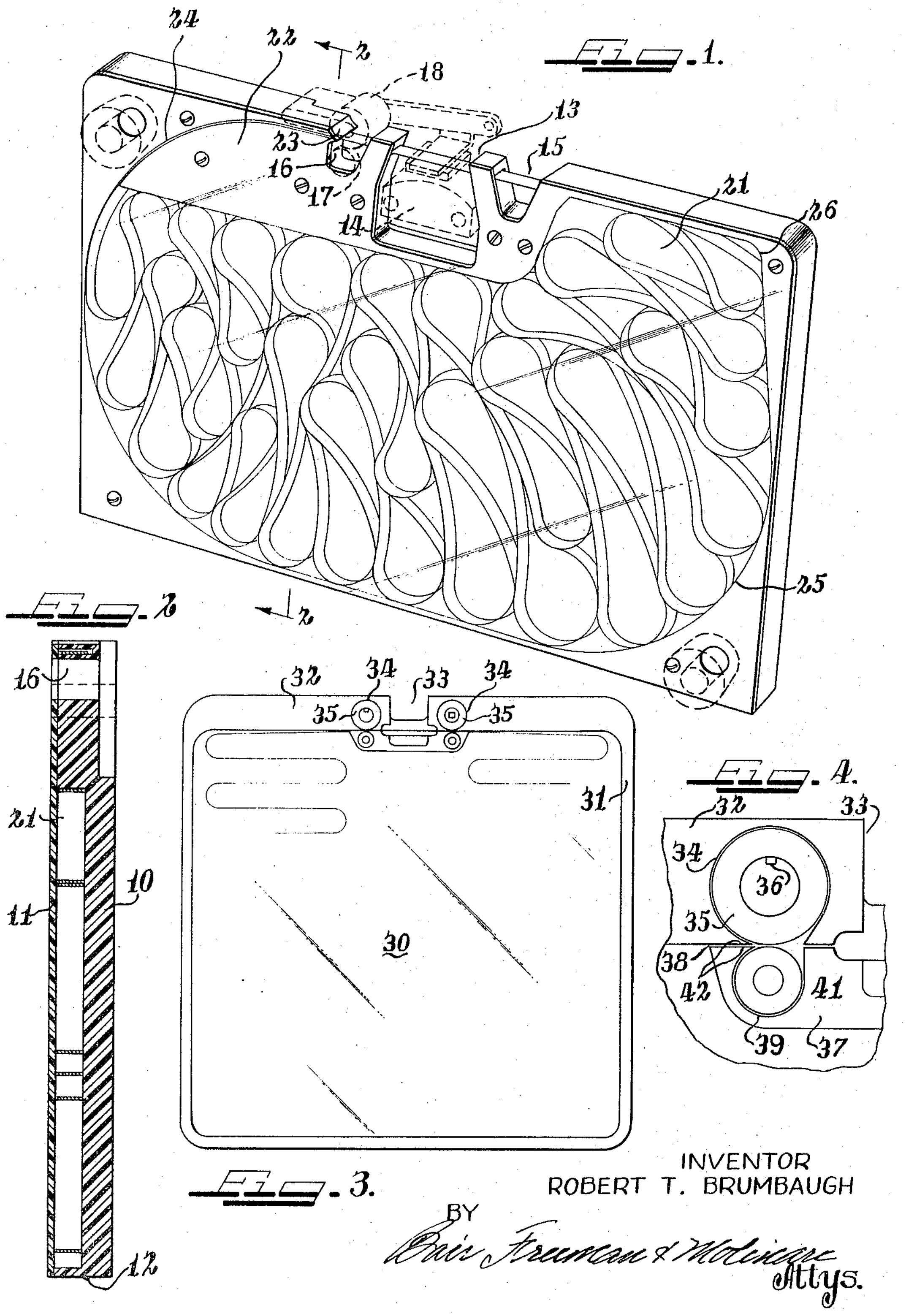
FIG. 1 is a perspective view of an endless tape cartridge embodying the invention.
FIG. 2 is a section on the line 2—2 of FIG. 1.
FIG. 3 is an elevation of an alternative form of cartridge.
FIG. 4 is an enlarged view showing the feed slot and lips.

The cartridge, according to the present invention, may be formed of any desirable material, but is conveniently made of moldable plastic. The cartridge is defined by a pair of flat spaced parallel walls 10 and 11, with the edges between the walls being closed at the periphery by edge portions 12. As seen in FIG. 2, the edge portions 12 may be integrally molded with the wall 10 and may be shaped to provide a desired interior configuration of the cartridge, as described more fully hereinafter.

At one side the cartridge is formed with a gap 13 which is adapted to receive a recording or reproducing head, indicated generally in dotted lines at 14. It will be understood that any conventional type of recording or reproducing head may fit into the gap to cooperate with the tape extending therethrough for recording on or reproducing from the tape. In the construction illustrated, the tape is a conventional magnetic tape having a plastic pad or base and which may be of any desired thickness on the order of one to several mils.

At one side of the gap 13 a second gap 15 is formed which in the embodiment shown in FIG. 1 is adapted to receive a brake for stopping the tape quickly. This braking mechanism is normally employed in connection with counting devices in which the tape is moved through very small rapid increments and in connection with which it is necessary to stop the tape quickly and accurately.

At the opposite side of the gap 13 a recess 16 is formed to receive one of a pair of driving rollers for driving the tape. The recess 16 extends completely to the periphery of the cartridge so that one roller, indicated at 17 in dotted lines, may fit into the portion of the recess below the tape and may cooperate with a second roller 18 to grip and drive the tape. These feed rollers may form a part of the machine with which the cartridge is used and may be separated for insertion or removal of the cartridge and moved together to grip the tape after the cartridge is placed on the machine in a manner conventional in connection with magnetic tape recording devices.

A magnetic tape, indicated generally at 21, lies in a series of random loops within the container, as generally shown in FIG. 1. The tape is in the form of an endless loop and extends through slots in the walls of the gaps 13 and 15 to be guided thereby for engagement by the recording head and the brake mechanism. The tape extends similarly through a slot separating the gap 13 from the recess 16 and at the downstream side of the recess 16 enters into a narrow guide slot defined by a guide block 22 conforming to the interior contour of the edge portion and spaced slightly therefrom.

According to an important feature of the present invention, the edge portion and the guide block 22 immediately adjacent to the downstream side of the recess 16 terminate in narrow sharp lips 23 which extend to a point closely adjacent to the bite of the drive rollers 17 and 18. With this construction when the tape is driven from right to left, as seen in FIG. 1, by the drive rollers it will be closely confined from the time it leaves the bite of the drive rollers until it passes beyond the guide block 22. During this portion of its travel the tape is placed under compression but because of the close guiding thereof in the guide slot and because of the close proximity of the lips 23 to the bite of the driving rollers the tape is held against buckling and will pass through the guide slot into the cartridge. It has been found that with this construction the tape can be fed successively either in small rapid increments or in a continuous manner at either relatively low or high rewind speeds.

As shown in FIG. 1, the edge portion of the cartridge is smoothly curved in an arc, as indicated at 24, downstream from the driving rollers and recess 16 with the guide block extending partially around the arcuate curved portion. The arcuate curved portion continues through substantially 180° to the side of the cartridge opposite to that in which the gaps and recesses are formed and a similar arcuate curved portion 25 is provided at the next adjacent corner portion of the cartridge. At the fourth corner portion immediately upstream from the gaps and recesses the cartridge is provided with a relatively small filet 26.

With the arcuate interior edge portions of the cartridge and particularly that shown at 24 it has been found that the tape tends to form itself into smaller relatively regular loops comprising a pattern of which that shown in FIG. 1 is more or less typical. The continuing arcuate portions through the two succeeding corners of the cartridge facilitates smooth movement of the looped tape through the cartridge so that it will be more or less uniformly distributed throughout the full cartridge area. While this is desirable, particularly for certain applications, it has been found not to be entirely essential. FIG. 3 shows an alternative cartridge construction which, as illustrated, is adapted for reversible drive of the tape as, for example, in the case of a cartridge which is reversed on the recording or reproducing machine to provide different recordings on opposite side or edge portions of the tape. In this construction, the cartridge is formed with front and back flat walls 30 corresponding to the walls 10 and 11 of FIG. 1 which are closed at their periphery by an edge portion 31. In this case, the edge portion 31 is generally rectangular with relatively short radius filets at the corners and is preferably thicker along one edge, as indicated at 32. The edge portion 32 is formed with a gap 33 into which a recording or reproducing head may fit. The edge portion 32 is also formed at opposite sides of the gap 33 with partially circular recesses 34, as more clearly seen in FIG. 4. Each of the recesses 34 is adapted to receive a driving roller 35 which substantially fills the recess and which is permanently journalled in the cartridge. Each of the rollers 35 is formed with a central hub opening of non-circular configuration which may either carry a spline 36, as shown, or be of other desired non-circular shape to receive a complementary driving spindle forming a part of the machine with which the cartridge is used.

A guide block member 37 is secured in the cartridge beneath the gap 33 and recesses 34 and extends beyond the recesses, as shown. The recess 33 may extend into the guide block as illustrated to provide space for a portion of the recording head and at its end portions the guide block is spaced from the adjacent inner surface of the edge portion 32 to define a guide slot 38 through which the tape extends.

The guide block 37 is formed adjacent to its ends with cylindrical recesses 39 registering with the recesses 34 in the edge portion 32. Drive rollers 41 are journalled in the recesses 39 and engage the lower portions of the drive rollers 35 respectively to grip the tape between them and to feed the tape.

The recesses 34 and 39 are so formed as to define at the downstream sides of the rollers thin lip portions 42 between which the slot 38 is formed and which extend to a point closely adjacent to the bite of the rollers, as best seen in FIG. 4. In this way the tape will be confined closely at the point where it is placed under compression by the rollers so that it can be pushed into the cartridge without buckling until after it has left the guide slot 38.

In the reversible cartridge, as shown in FIG. 3, the pairs of drive rollers 35 and 41 are selectively driven through cooperation with the recording or reproducing machine so that the tape is always pulled through the gap 33 and the recording head therein and is then pushed into the cartridge at the side of the effective drive rollers which is remote from the gap and recording head. Since the tape is under tension while passing through the recording head and is closely confined by the guide slot 38 in the area immediately downstream from the effective side of drive rollers where it is under compression the tape can be fed easily into the cartridge.

Preferably the inner surface of the edge portion 32 constitutes a smooth continuation of the upper edge of the drive slot 38 so that when the tape enters the cartridge it will have a tendency to flow along this surface and to loop upon itself when it reaches the corner portion of the cartridge. In this way the tape tends to form into relatively regular loops as generally indicated at the left of FIG. 3 although this pattern will not necessarily be followed since the looping of the tape is completely random.

With both of the cartridge constructions as shown a relatively long length of tape can be stored and confined in a relatively small cartridge and can be fed freely through the gap portions provided at one side of the cartridge easily with no inertia and with no tangling.

While one embodiment of the invention has been shown and described herein, it will be understood that it is illustrative only and not to be taken as a definition of the scope of the invention, reference being had for this purpose to the appended claims.

What is claimed is:

1. An endless tape cartridge comprising, in combination with an endless loop of flexible tape, a container including parallel flat walls spaced apart a distance slightly greater than the width of the tape, edge portions closing the space between the flat walls at the periphery thereof, the edge portions being formed with arcuate recesses to receive rollers for driving the tape and with a slot therein aligned with the bite of the rollers through which the tape passes and terminating in thin lips closely adjacent to the bite of the rollers at the side thereof toward which the tape is moved, the lips and slot therebetween closely confining the tape between the bite of the rollers and a point downstream thereof in which the tape is in compression.

2. The cartridge of claim 1 in which the edge portion defines a substantially straight continuation of one side of the slot downstream from the slot along which the tape moves and forms itself into random loops.

3. The cartridge of claim 1 in which the edge portion extends substantially straight downstream of the rollers and then curves smoothly in a substantially arcuate curve extending through at least 90°.

4. An endless tape cartridge comprising, in combination with an endless loop of flexible tape, a container including parallel flat walls spaced apart a distance slightly greater than the width of the tape, edge portions closing the space between the flat walls at the periphery thereof, the edge portions being formed with arcuate recesses to receive rollers for driving the tape, rollers in the recesses to engage and drive the tape, the walls of the recesses being formed with slots therein aligned with the bite of the rollers and through which the tape extends, the slot at the downstream side of the rollers terminating in thin lips extending substantially into the bite of the rollers to receive and guide the tape as it leaves the rollers.

5. An endless tape cartridge comprising, in combination with an endless loop of flexible tape, a container including parallel flat walls spaced apart a distance slightly greater than the width of the tape, edge portions closing the space between the flat walls at the periphery thereof, the container being formed at one side with a gap to receive a head for reacting with the tape, and with two pairs of recesses respectively at opposite sides of the gap to receive driving rollers for selectively driving the tape in one direction or the other, the walls of the recesses and gap being formed with aligned slots therein through which the tape extends, and the slots at the sides of each pair of recesses remote from the gap terminating in thin lips projecting substantially into the bite of rollers in the recesses to confine and guide the tape as it leaves the rollers.

6. The cartridge of claim 5 including drive rollers permanently journaled in the recesses, at least one roller of each pair being formed with a hub shaped to engage an external driving means.

(References on following page)

References Cited by the Examiner

UNITED STATES PATENTS

| | | | |
|---|---|---|---|
| 2,317,070 | 4/1943 | LeTourneau | 287—53 |
| 2,960,611 | 11/1960 | Namenyi-Katz | 226—118 X |
| 3,161,337 | 12/1964 | Schulz | 226—168 X |
| 3,174,671 | 3/1965 | Gilman et al. | 226—118 |

FOREIGN PATENTS 885,343 12/1961 Great Britain.

M. HENSON WOOD, Jr., *Primary Examiner.*

C. H. SPADERNA, R. A. SCHACHER, *Assistant Examiners.*